United States Patent
Sarwary et al.

(10) Patent No.: US 7,506,292 B2
(45) Date of Patent: Mar. 17, 2009

(54) METHOD FOR CLOCK SYNCHRONIZATION VALIDATION IN INTEGRATED CIRCUIT DESIGN

(75) Inventors: Mohamed Shaker Sarwary, Union City, CA (US); Mohammad Movahed Ezazi, Saratoga, CA (US); Bernard Murphy, San Jose, CA (US)

(73) Assignee: Atrenta, Inc., San Jose, CA (US)

( * ) Notice: Subject to any disclaimer, the term of this patent is extended or adjusted under 35 U.S.C. 154(b) by 406 days.

(21) Appl. No.: 11/276,819

(22) Filed: Mar. 15, 2006

(65) Prior Publication Data
US 2006/0150043 A1    Jul. 6, 2006

Related U.S. Application Data

(63) Continuation of application No. 10/695,803, filed on Oct. 30, 2003, now Pat. No. 7,073,146.

(51) Int. Cl.
*G06F 17/50* (2006.01)
(52) U.S. Cl. ..................... 716/6; 716/4; 716/5
(58) Field of Classification Search .............. 716/1, 716/4, 5, 6
See application file for complete search history.

(56) References Cited

U.S. PATENT DOCUMENTS

| | | | |
|---|---|---|---|
| 5,680,543 A | 10/1997 | Bhawmik | |
| 6,173,435 B1 | 1/2001 | Dupenloup | |
| 6,263,483 B1 | 7/2001 | Dupenloup | |
| 6,292,931 B1 | 9/2001 | Dupenloup | |
| 6,295,636 B1 | 9/2001 | Dupenloup | |
| 6,396,887 B1 | 5/2002 | Ware et al. | |
| 6,415,430 B1 | 7/2002 | Ashar et al. | |
| 6,421,818 B1 | 7/2002 | Dupenloup et al. | |
| 6,473,439 B1 | 10/2002 | Zerbe et al. | |
| 6,496,966 B1 | 12/2002 | Barney et al. | |
| 6,744,285 B2 | 6/2004 | Mangum et al. | |
| 2002/0120896 A1 | 8/2002 | Wang et al. | |
| 2002/0184560 A1 | 12/2002 | Wang et al. | |
| 2002/0194520 A1 | 12/2002 | Johnson | |

*Primary Examiner*—Sun J Lin
(74) *Attorney, Agent, or Firm*—Sughrue Mion, PLLC

(57) ABSTRACT

Unsynchronized clock-domain crossings in the design of integrated circuit are detected by searching for clock-crossing domains. For each clock-crossing that does not include an explicit synchronization cell, an analysis determines if the clock is stable crossing the domains.

21 Claims, 5 Drawing Sheets

METHOD FOR CLOCK SYNCHRONIZATION VALIDATION IN INTEGRATED CIRCUIT DESIGN

CROSS-REFERENCE TO RELATED APPLICATIONS

This application is a continuation of U.S. application Ser. No. 10/695,803 filed Oct. 30, 2003, which issued as U.S. Pat. No. 7,073,146 on Jul. 4, 2006, the disclosure of which is incorporated herein by reference in its entirety.

FIELD OF THE INVENTION

The field of the invention is integrated circuit (IC) design, and more particularly to clock synchronization validation in IC design.

BACKGROUND OF THE INVENTION

In recent years the size of ICs has dramatically increased in both physical size and number of logical components. This has resulted in multiple clocks activating the logical components. In typical IC designs, a clock domain is defined as a set of all logical components (e.g., flip-flops, registers, synchronous RAM, and so on) that are clocked on the same edge of the same clock net. Clock domains that exchange data, also referred to as "clock-domain crossing" needed to be interfaced and synchronized in reliable and predictable ways to ensure the proper transfer of data from one clock domain to another.

In the related art, there are several techniques for avoiding asynchronous clock-domain crossing and to reduce the probability of meta-stability. These techniques are based on adding a combinational logic which interfaces between the two time domains.

Reference is now to FIG. 1 where a logic circuit 100 including two clock domains 120 and 140, is shown. The first clock domain 120 includes a register 122 clocked by a first clock signal "Clk1". The second clock domain 140 includes a register 142 clocked by a second clock signal "Clk2". It will be appreciated herein that the term, "register" as used in this description has a special meaning, and is not limited to just a register. Instead, the term "register" means any logic component for holding data, such as any type of flip-flop, memory cell, or combinational logic loops that form a de facto memory, and the like. Thus, "register" as used herein is just a convenient shorthand notation for the foregoing equivalents, and any similar device or combination of devices for performing this memory function.

Logical circuit 100 further includes a synchronization cell 130 which interfaces between the first clock domain 120 and the second clock domain 140. Synchronization cell 130 may include combinational logic circuit including registers, multiplexers (MUXs), sequential logical, or combinations thereof. Typically, synchronization cell 130 is a simple logic, such as a double-level register or a recirculation MUX double-registered control. However, in some cases, more complex circuits may be utilized for synchronization cell 130, for example, a handshaking mechanism which may be a complex sequential circuit. Essentially, synchronization cell 130 is designed to prevent register 142 from sampling data, while register 122 is changing the data.

Clock synchronization validation in clock-crossing domains is one of the most important and difficult tasks in verification of large ICs. In the related art, analysis tools are used for verification of clock-domain crossing early in the design process. The verification is performed by identifying synchronization cells in the design. Simple synchronization cells, such as a double-level register and a recirculation MUX, can be easily verified by exploring the structure of the IC's design. This verifying process is usually referred to as "structurally verifiable". On the other hand, complex synchronization cells, such as a handshake mechanism, can be verified using advanced functional analysis. This verifying process is usually referred to as "functionally verifiable". In both cases, prior art analysis tools require the user's intervention in specifying a different set of data and a different type of test. Moreover, such tools generally identify all asynchronous clock domains that are not structurally verifiable as invalid asynchronous clock domains, even if those clock domains are well synchronized. This requires the designer to spend significant time in verifying each asynchronous clock domain separately. In typical ICs, where the number of clock-domain crossing may be large, this is an inefficient and a time-consuming task as well as being error prone.

Therefore, in the view of the limitations introduced in the prior art, it would be advantageous to provide an efficient solution that would verify the validity of clock-crossing domains in the absence of explicit synchronization cells. It would be further advantageous if the provided solution would identify functionally verifiable circuits without the user intervention.

SUMMARY OF THE INVENTION

The above and other advantages are achieved in various embodiments of the invention, including a system, method, and computer program product providing an improved method for clock synchronization validation in IC design. The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
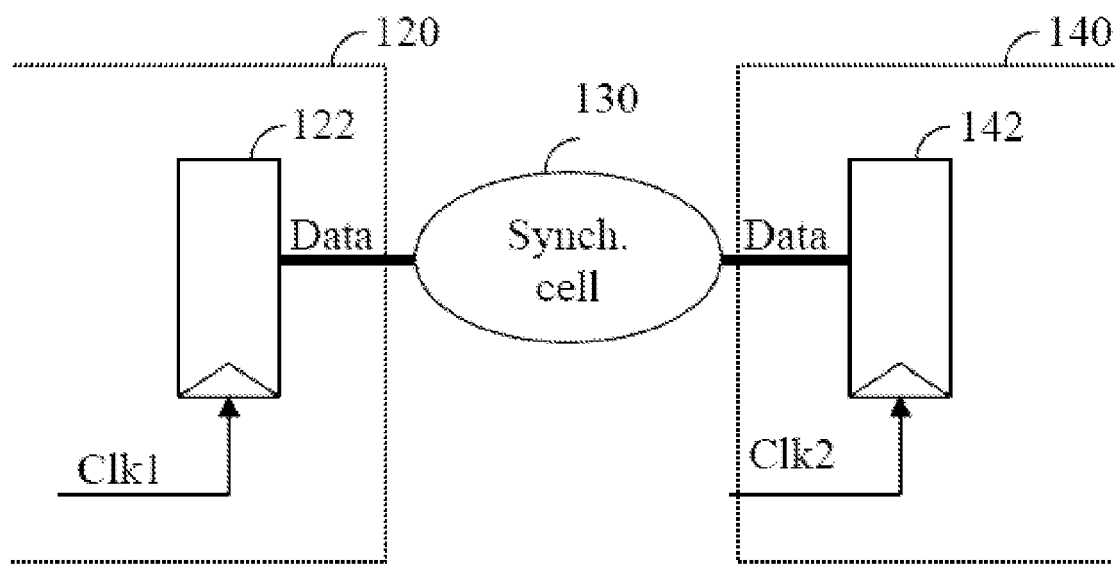
FIG. 1 is an exemplary logic circuit showing a clock-domain crossing.
Figure 2:
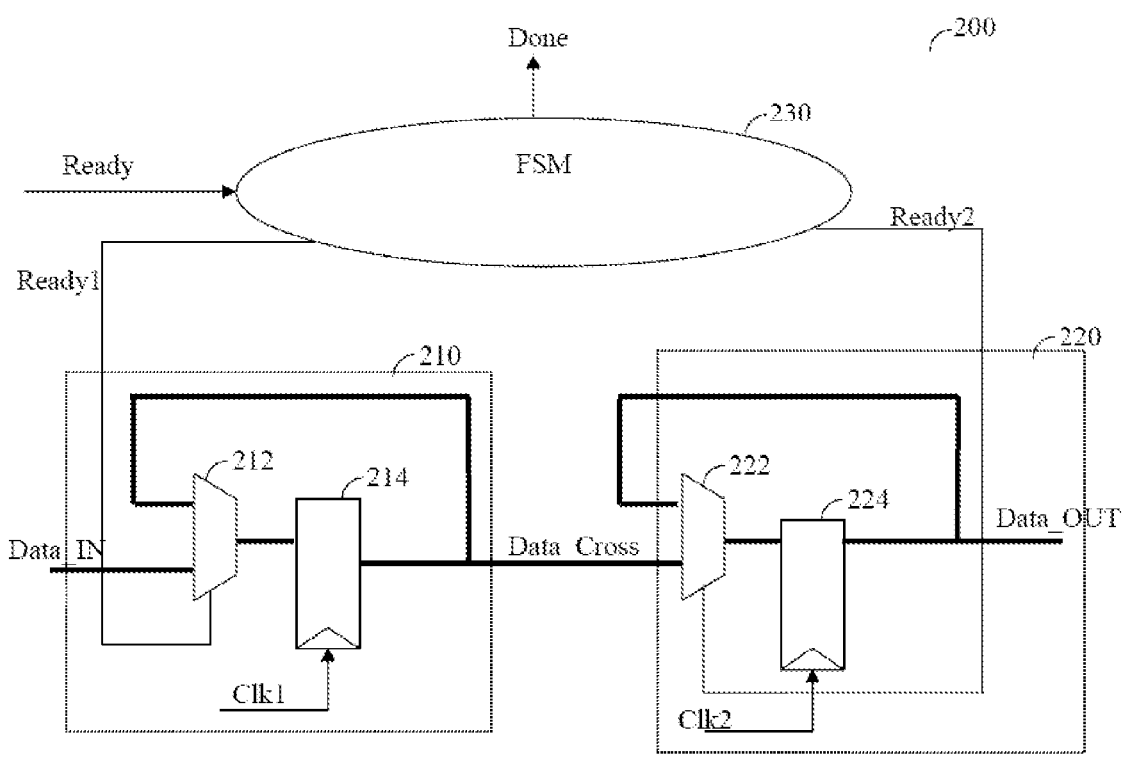
FIG. 2 is an exemplary logic circuit that can be analyzed and verified by the method for clock synchronization validation.

Reference is now made to FIG. 2 where an exemplary logic circuit 200 to be verified by the method for clock synchronization validation, is shown. Circuit 200 includes a first clock domain 210 and a second clock domain 220. The first clock domain 210 includes a MUX 212 and a register 214 clocked by clock signal "Clk1". The second clock domain 220 includes a MUX 222 and a register 224 clocked by clock signal "Clk2". Clock domain 210 sends data to clock domain 220 through a data bus "Data Cross". Circuit 200 does not include a structural synchronization cell, such as a double-level register. There is a recirculation MUX (i.e., MUXs 212 and 222), but since the MUX's control is not double-registered it is not considered as a valid synchronization cell. However, circuit 200 includes a finite state machine (FSM) 230 that synchronizes between first clock domain 210 and second clock domain 220. FSM 230 ensures that register 224 does not sample data while register 214 loads data (i.e., changing its value). To facilitate this, FSM 230 receives a "Ready" signal indicating that data is ready to be transferred from clock domain 210 to clock domain 220, i.e., from register 214 to resister 224. As a result, FSM 230 generates three different signals "Ready_1", "Ready_2", and "Done". "Ready_1" loads the data into data bus "Data_Cross" and locks the value in bus "Data_Cross" until it is outputted on a data bus "Data_Out". "Ready_2" is generated one or more clock cycles after "Ready_1" is asserted. Finally, the "Done" signal is sent back to the control of the first clock domain 210 to enable new data to be loaded.

FSM 230 provides a stable clock-crossing domain, even though circuit 200 does not include an explicit synchronization cell. A stable clock-crossing domain is considered as a correct design. As mentioned above, prior art solutions would classify circuit 200 as an unstable clock-crossing domain. The method for clock synchronization validation detects unstable clock-crossing domains by checking if register 224 samples data while register 214 loads data. In order to detect unstable clock-domain crossing in the design of ICs the following steps are taken: a) searching for all clock domains crossing from a first register to a second register in the IC's design; b) for each clock-crossing domain, checking if an explicit synchronization cell exists; c) for each clock-crossing domain that does not include an explicit synchronization cell, an in-depth functional analysis is performed; and, d) reporting unstable clock-crossing domains found in the design.

Figure 3:
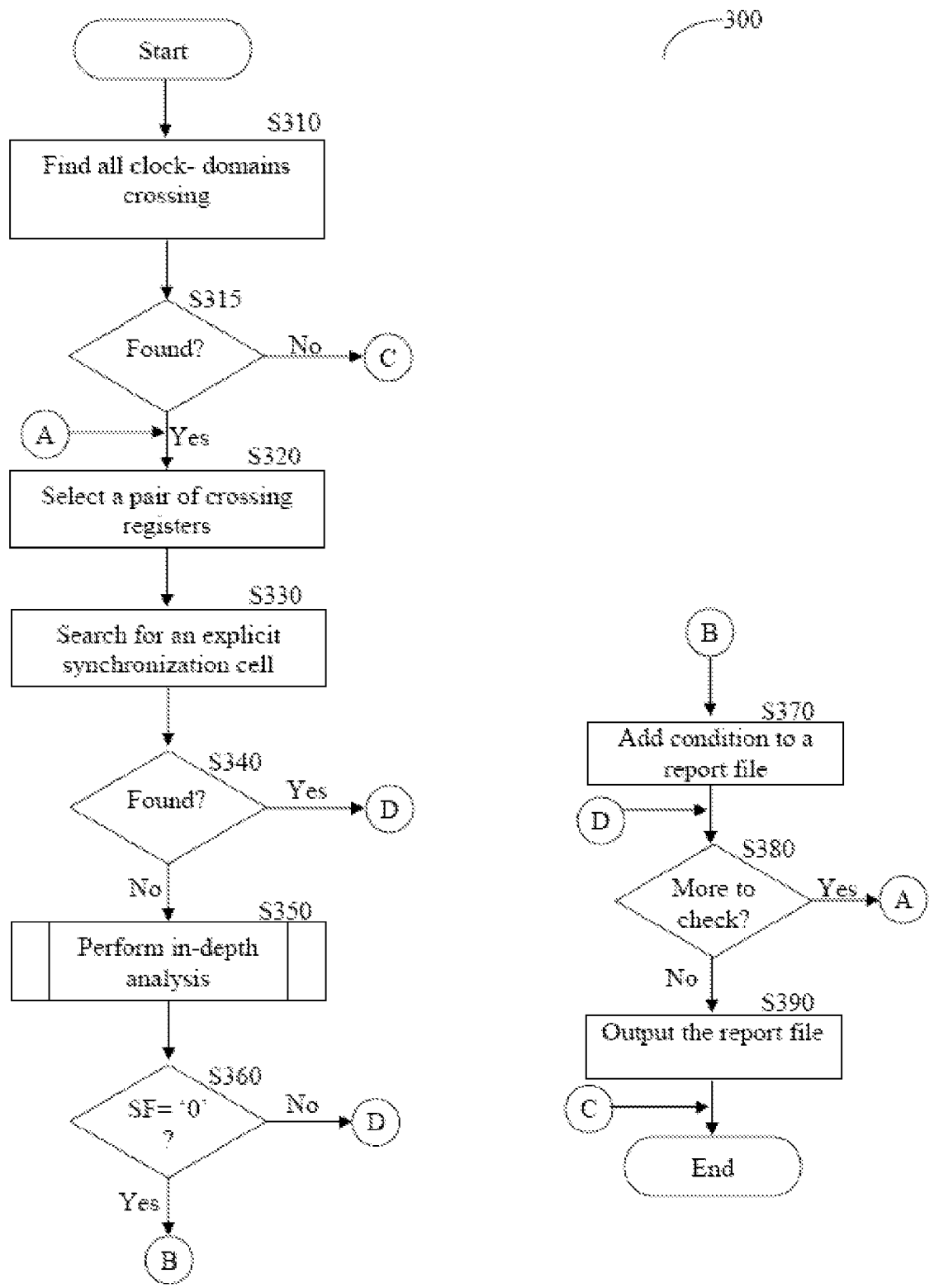
FIG. 3 is a non-limiting flowchart describing the method for detecting an unstable clock-domain crossing in the design of ICs, in accordance with the method for clock synchronization validation.

Reference is now made to FIG. 3 where a non-limiting flowchart 300 describing the method for detecting unstable clock-domain crossings in the design of ICs, in accordance with the method for clock synchronization validation, is shown. While operation of the method herein is discussed for a small circuit, this is performed for exemplary purposes only. Specifically, the disclosed method is operative in ICs having a large number of logic gates and a large number of clock domains.

At step S310, all clock-domain crossing encountered in a given IC design, are identified. That is, pairs of registers connected through a combinational path, which are clocked by different clocks, are searched for. The clock crossing registers are detected using a synthesized netlist produced by an IC synthesis tool. Synthesis tools produce gate level netlists based, for example, on the register transfer level (RTL) representation. Netlists generally include logical gates such as AND, NAND, NOR, OR, XOR, NXOR, NOT, and the like. One such synthesis tool is disclosed in a U.S. patent application entitled "An Apparatus and Method for Handling of Multi-Level Circuit Design Data", Ser. No. 10/118,242, assigned to common assignee and is hereby incorporated by reference for all that it contains, especially for its helpful background teaching relating to a synthesis tool. All pairs of crossing registers are saved in a temporary list (hereinafter, the "crossing registers list").

At step S315, it is determined if the crossing registers list is empty. If the list is empty, then execution ends; otherwise, execution continues with step S320. At step S320, a single pair of clock crossing registers is picked from the crossing registers list, namely a clock-domain crossing to be analyzed is selected. At step S330, a search for a structural synchronization cell in the selected clock-domain crossing is performed. A structural synchronization cell may be, but is not necessarily limited to, a double-level register, a recirculation MUX with double-register control, or any other logic that is explicitly used to synchronize the clock-domain crossing. In one embodiment, the user may define such a synchronization cell and adapt the disclosed method to handle it as a structural synchronization cell. At step S340, a check is performed to determine if a structural synchronization cell was found. If found the execution continues with step S380; otherwise, execution continues with step S350.

At step S350, in-depth analysis is performed to determine if the selected clock-domain crossing is stable. The in-depth analysis evaluates a stability function over multiple time frames, where each time frame is defined as a clock cycle driving the relevant registers. The stability function is defined as follows:

$$Ri(t)!=Ri(t+1)=>Rj(t)=Rj(t+1)$$

where the register pair (Ri, Rj) belongs to the selected clock-domain crossing. Rk(t) will be used to represent the contents of a kth register at time 't'. The stability function implies that Rj must be disabled while Ri loads its new data. This condition ensures the correct stabilization of values in registers across the selected clock-domain crossing. A detailed description of step S350 is provided with reference to FIG. 4.

At step S360, a check is performed to determine if step S350 returns an indication of an unstable clock-domain crossing, i.e., if the stability function equals to '0'. If step S360 yields an affirmative answer, then at step S370, the unstable condition, i.e., the time frame that caused the violation as well as the clock crossing registers are added to a report, e.g., a file or a display list; otherwise, the execution continues with step S380. At step S380, a check is performed to determine if the crossing registers' list is empty, namely if all clock-crossing domains, found in the design, were examined. If the crossing registers' list is not empty, then execution continues at step S320; otherwise, execution continues at step S390 where the report is outputted. In one embodiment, the method disclosed may highlight on a display or other manner the unstable clock-crossing domains in the design. This would allow a user to easily recognize the unsynchronized registers and clocks in the design of ICs.

Figure 4:
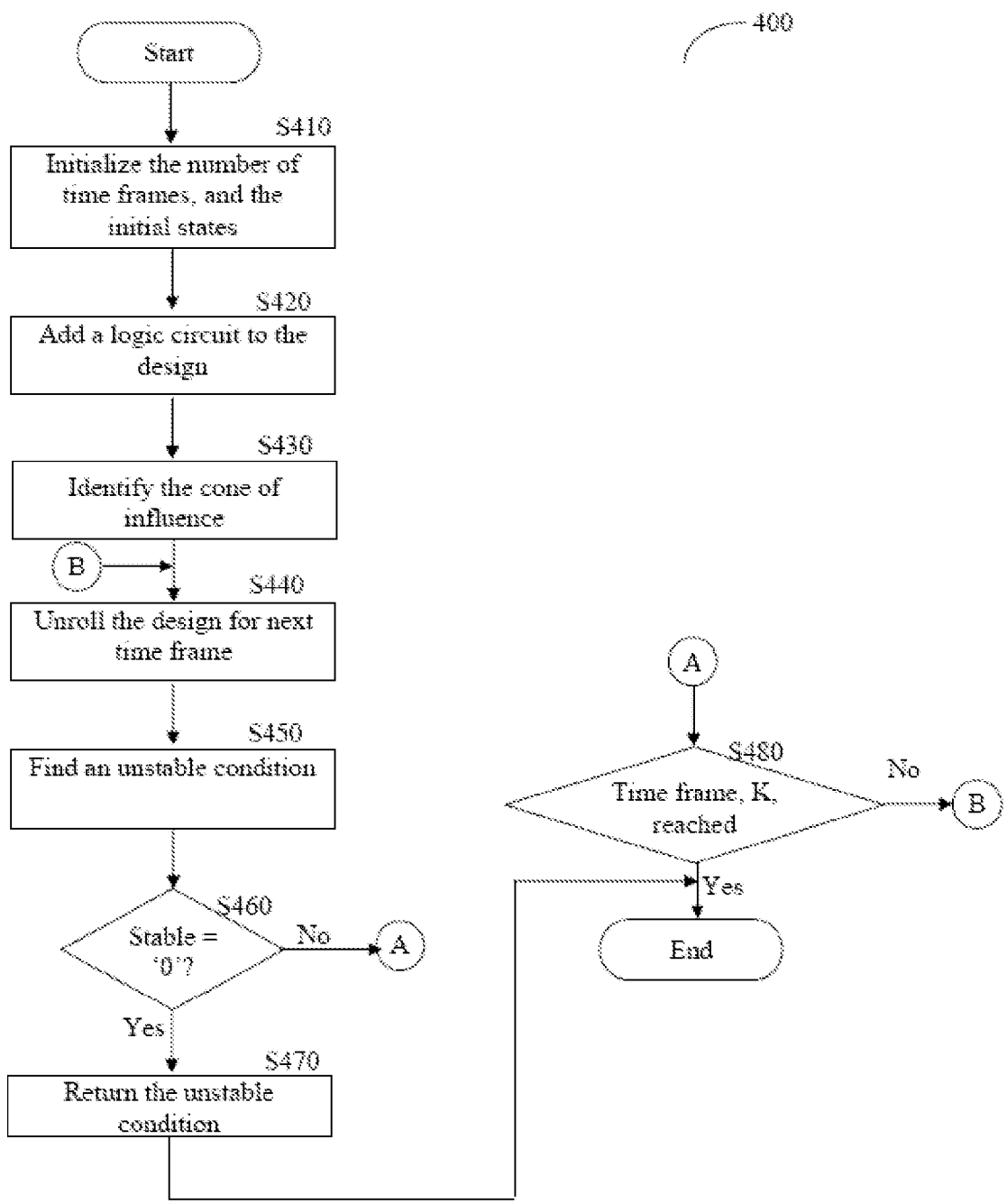
FIG. 4 is a non-limiting flowchart describing the method for performing in-depth analysis, in accordance with the method for clock synchronization validation.

Reference is now made to FIG. 4 where a non-limiting method 400 describing the in-depth analysis process in accordance with the method for clock synchronization validation, is shown.

The in-depth analysis verifies the stability function in multiple different time frames. The stability function is a temporary function that may be verified using any formal verification approach including, but not limited to, model checking, bounded model checking (BMC), and so on. In one embodiment of the method for clock synchronization validation the stability function is verified using the BMC technique. The BMC explores the state space of a given design in a bounded number of cycles. Using BMC, the design is explored to find a at least one condition (i.e., a witness condition) for instability. The design is explored within a bounded number ('K') of cycles. The BMC problem is efficiently reduced to a propositional satisfiability problem which can be solved using a Boolean satisfiability (SAT) solver. Generally, a SAT solver is used to find an assignment of binary values to a set of inputs and registers of the design, such that temporal property is set to '1'. The BMC techniques and the SAT solvers are used at the core of many applications in computed aided design (CAD) tools for the purpose of verifying the correctness of the design.

Figure 5:
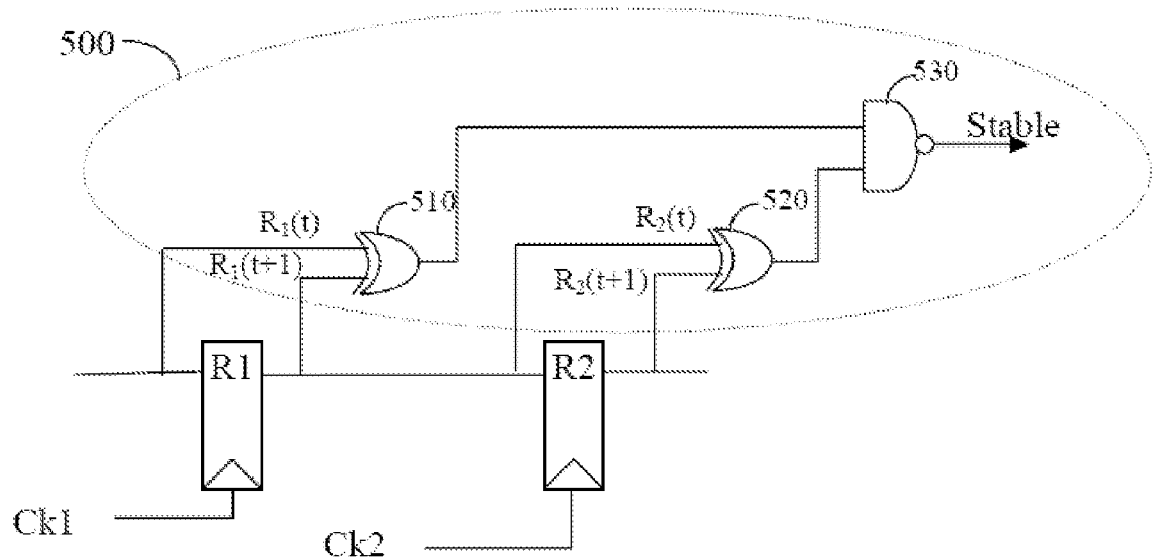
FIG. 5 is an exemplary logic circuit that implements the stability function, in accordance with present invention.

At step S410, the number of time frames is set to the bound number 'K' of time frames over which the analysis to be carried out. In addition, a set of initial states for the analysis process are determined. The initial states may be defined by the user or automatically uploaded. At step S420, a logic circuit which implements the stability function is added to the design. Referring now to FIG. 5 where an exemplary logic circuit 500 implements the stability function, in accordance with present invention, is shown. Circuit 500 includes the following logic gates: exclusive or (XOR) gates 510 and 520, as well as an AND gate 530. Registers R1 and R2 are considered as crossing registers and are part of the original design. Circuit 500 outputs a "stable" signal which determines if the tested clock crossing domain is stable, i.e., if the stability function is valid. If the "stable" signal equals to '0', then the design is considered unstable. Circuit 500 implements the stability function, since the "stable" signal equals to '0' (i.e., unstable) if and only if XOR gates 510 and 520 output '1'. XOR gate 510 outputs '1' only if R1 (t) is not equal to R1(t+1) (i.e., R1 (t)!=R1(t+1)). XOR gate 520 outputs '1' only if R2(t) is not equal to R2(t+1) (i.e., R2(t)!=R2(t+1)). In other words, circuit 500 reports instability if both R1 and R2 change data simultaneously which is violating the condition R1(t)!=R1(t+1)=>R2(t)=R2(t+1), which is the stability function. Circuit 500 is added to the design on the fly, i.e., the process of adding circuit 500 to the design is transparent to the user. As method 400 ends, circuit 500 is removed from the design.

At step S430, the logic that influences the stability function (hereinafter "the cone of influence") is identified and isolated for analysis. The cone of influence may include sequential logic or a combinational logic. At step S440, the cone of influence along with circuitry 500 are unrolled for analysis over a given time frame. The unrolling process can be seen as replicating the cone of influence and connecting the replicated nets to the pervious net. Hence, at time frame 'n' the unrolled design is a design cascaded 'n' times, where time frame 'i' feeds time frame 'i+1' for all values of 'i' smaller than 'n' (i.e., i<n). At step S450, a SAT engine is used to find a condition under which the "Stable" signal equals to '0'. At step S460, a check is performed to determine if the "Stable" signal equals to '0'. If the "Stable" signal equals to '0', then at step S470 the tested clock crossing domain is reported as unstable; otherwise, execution continues with step S480. At step S480, a check is performed to determine if the bound number of time frames ('K') for analysis is reached. If so, execution is ended; otherwise execution continues with step S440.

It should be appreciated by a person skilled in the art that the stability function may be expressed in forms other than the one described above. For example, the stability function may alternatively be expressed in the following ways:

$$(R2(t)=R2(t+1)) \text{ OR } (R1(t)=R1(t+1))$$

or $$((R2(t) \text{NXOR } R2(t+1)) \text{ OR } (R1(t) \text{NXOR } R1(t+1))).$$

These alternative definitions also could be used to form circuit 500 described above.

The method disclosed can be further embodied by a person skilled in the art as part of a computer software program, a computer aided design (CAD) system, a CAD program, and the like.

In one embodiment the method for clock synchronization validation is operative in conjunction with standard clock synchronization analysis tools to eliminate the false violations reported by such tools. In this embodiment, the method for clock synchronization validation receives a list of clock crossing-domains reported as unstable, and for each clock-crossing domain performs in-depth analysis as described in greater detailed above. This would relieve designers from the need to verify separately each and every clock-crossing domain reported by the standard tools as being unstable.

Many variations to the above-identified embodiments are possible without departing from the scope and spirit of the invention. Possible variations have been presented throughout the foregoing discussion. Combinations and subcombinations of the various embodiments described above will occur to those familiar with this field, without departing from the scope and spirit of the invention.

Furthermore, although the embodiments herein have been described in terms of a method, it will occur to the person familiar with this field to implement such operations in a computer system that includes a processor and appropriate instructions for enabling the computer to perform the operations. Likewise, such operations could be implemented in a computer program product having a computer readable medium and instructions for enabling a computer to perform the operations. Here, the terms "computer system" and "computer program product" should be understood in their most broad and far-reaching sense, even including systems, processors, and computer readable media hereafter developed.

There is claimed:

1. A method for verifying unstable clock-domain crossings in integrated circuit (IC) designs, comprising: identifying candidate unstable clock-domain crossings using a clock synchronization analysis tool; performing a validity check for each of the candidate unstable clock-domain crossings; and eliminating a candidate unstable clock-domain crossing when the validity check does not indicate an unstable clock-domain crossing;

wherein the validity check comprises making a stability determination for each of the candidate unstable clock-domain crossings, and wherein the stability determination is based on satisfaction of a stability function.

2. The method of claim 1, wherein the unstable clock-domain crossing is indicated when a time frame destabilizes a clock-domain crossing.

3. The method of claim 2, wherein the time frame comprises a set of clock signals, and wherein each of the clock signals clocks a different register belonging to the candidate unstable clock-domain crossing.

4. The method of claim 1, wherein the clock synchronization analysis tool performs a structural analysis.

5. The method of claim 1, executed on at least one of: computer aided design (CAD) system, a CAD program, a clock synchronization analysis tool.

6. A method for verifying unstable clock-domain crossings in integrated circuit (IC) designs, comprising: identifying candidate unstable clock-domain crossings using a clock synchronization analysis tool; performing a validity check for each of the candidate unstable clock-domain crossings; and eliminating a candidate unstable clock-domain crossing when the validity check does not indicate an unstable clock-domain crossing;

wherein the validity check comprises making a stability determination for each of the candidate unstable clock-domain crossings, and wherein the stability determination is performed using at least one of model checking and bounded model checking (BMC).

7. The method of claim 6, wherein the BMC is performed using at least a Boolean satisfiability (SAT) solver.

8. A computer program product, including a computer readable medium with computer instructions, for use by a computer to perform operations for verifying unstable clock-domain crossings in integrated circuit (IC) designs, comprising: identifying candidate unstable clock-domain crossings using a clock synchronization analysis tool; performing a validity check for each of the candidate unstable clock-domain crossings, and eliminating a candidate unstable clock-domain crossing when the validity check does not indicate an unstable clock-domain crossing;

wherein the validity check comprises making a stability determination for each of the candidate unstable clock-domain crossings, and wherein the stability determination is based on satisfaction of a stability function.

9. The computer program product of claim 8, wherein the unstable clock-domain crossing is indicated when a time frame destabilizes a clock-domain crossing.

10. The computer program product of claim 9, wherein the time frame comprises a set of clock signals, and wherein each of the clock signals clocks a different register belonging to the candidate unstable clock-domain crossing.

11. The computer program product of claim 8, wherein the clock synchronization analysis tool performs a structural analysis.

12. The computer program product of claim 8, executed on at least one of: computer aided design (CAD) system, a CAD program, a clock synchronization analysis tool.

13. A computer program product, including a computer readable medium with computer instructions, for use by a computer to perform operations for verifying unstable clock-domain crossings in integrated circuit (IC) designs, comprising: identifying candidate unstable clock-domain crossings using a clock synchronization analysis tool; performing a validity check for each of the candidate unstable clock-domain crossings; and eliminating a candidate unstable clock-domain crossing when the validity check does not indicate an unstable clock-domain crossing;

wherein the validity check comprises making a stability determination for each of the candidate unstable clock-domain crossings, and wherein the stability determination is performed using at least one of model checking and bounded model checking (BMC).

14. The computer program product of claim 13, wherein the BMC is performed using at least a Boolean satisfiability (SAT) solver.

15. A computer system, adapted to implement a method for detecting unstable clock-domain crossings in a design of an integrated circuit (IC), comprising: a processor; and a memory including software instructions adapted to enable the computer system to perform the operations of: identifying candidate unstable clock-domain crossings using a clock synchronization analysis tool; performing a validity check for each of the candidate unstable clock-domain crossings; and eliminating a candidate unstable clock-domain crossing when the validity check does not indicate an unstable clock-domain crossing;

wherein the validity check comprises making a stability determination for each of the candidate unstable clock-domain crossings; and wherein the stability determination is based on satisfaction of a stability function.

16. The system of claim 15, wherein the unstable clock-domain crossing is indicated when a time frame destabilizes a candidate clock-domain crossing.

17. The system of claim 16, wherein the time frame comprises a set of clock signals, and wherein each of the clock signals clocks a different register belonging to the candidate unstable clock-domain crossing.

18. The system of claim 15, wherein the clock synchronization analysis tool performs a structural analysis.

19. The system of claim 15, executed on at least one of: computer aided design (CAD) system, a CAD program, a clock synchronization analysis tool.

20. A computer system, adapted to implement a method for detecting unstable clock-domain crossings in a design of an integrated circuit (IC), comprising: a processor; and a memory including software instructions adapted to enable the computer system to perform the operations of: identifying candidate unstable clock-domain crossings using a clock synchronization analysis tool; performing a validity check for each of the candidate unstable clock-domain crossings; and eliminating a candidate unstable clock-domain crossing when the validity check does not indicate an unstable clock-domain crossing;

wherein the validity check comprises making a respective stability determination for the candidate unstable clock-domain crossings; and wherein the stability determination is performed using at least one of model checking and bounded model checking (BMC).

21. The system of claim 20, wherein the BMC is performed using at least a Boolean satisfiability (SAT) solver.

* * * * *